United States Patent
Calman

(10) Patent No.: US 8,732,077 B2
(45) Date of Patent: *May 20, 2014

(54) NOTIFICATION OF ALTERNATIVE PAYMENT CHANNEL

(75) Inventor: Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,385

(22) Filed: Sep. 14, 2012

(65) Prior Publication Data

US 2014/0081838 A1 Mar. 20, 2014

(51) Int. Cl.
*G06Q 40/00* (2012.01)

(52) U.S. Cl.
USPC .................................. 705/39; 705/35; 705/44

(58) Field of Classification Search
USPC ................................................ 705/35, 39, 44
See application file for complete search history.

(56) References Cited

U.S. PATENT DOCUMENTS

| | | | |
|---|---|---|---|
| 6,999,943 B1* | 2/2006 | Johnson et al. | 705/39 |
| 2010/0145854 A1* | 6/2010 | Messerges et al. | 705/44 |
| 2011/0191149 A1* | 8/2011 | Blackhurst et al. | 705/14.1 |
| 2013/0117170 A1* | 5/2013 | Coppinger | 705/35 |

OTHER PUBLICATIONS

Yancey, T. H. (2001). Issues in the income tax treatment of environmental costs. Tax Management Real Estate Journal, 17(9), 253-278. Retrieved from http://search.proquest.com/docview/215397058?accountid=14753.*

Claybrook, J. (2003). Many consumers expect to be ripped off. Automotive News, 78(6072), 14. Retrieved from http://search.proquest.com/docview/219417960?accountid=14753.*

* cited by examiner

*Primary Examiner* — Muriel Tinkler
(74) *Attorney, Agent, or Firm* — Michael A. Springs; Moore & Van Allen PLLC; James C. Edwards

(57) ABSTRACT

Systems, methods, and computer program products are defined for notifying customers, post-transaction of the ability to change payment form for the just completed transaction. In addition, the notification may include the advantages presented by the alternative payment forms and/or the optimal payment form for the completed transaction. Once notified, the customer may effortlessly and automatically change the payment form if so desired. If the payment form is changed to an interest-bearing payment form, such as a credit or loan account, the customer may be subsequently notified with an option to automatically and immediately pay-off the transaction amount using another customer account, such as a savings account, checking account or the like.

22 Claims, 4 Drawing Sheets

NOTIFICATION OF ALTERNATIVE PAYMENT CHANNEL

FIELD

In general, embodiments herein disclosed relate to commerce and, more specifically, providing customers with the ability to change payment type (i.e., channel) post-transaction.

BACKGROUND

In many instances a customer is not aware of the advantages that a certain payment type (e.g., a specific credit account, a debit account, a checking account, e-commerce payment entity, cash or the like) may afford them at the time the customer conducts the transaction. In some instances this is because the advantages may be tied to the type of products or services being purchased, the transaction amount and/or the merchant associated with the transaction.

These advantages may come in the form of a lower cost for the product or service transacted for, lower interest rates, cash-back rewards, loyalty program points or rewards, extended warranty coverage or the like. However, in many instances, the advantages served by a payment type may be offset by detriments that customer prefers not to incur. For example, while certain credit payment forms (e.g. credit accounts) may afford cash-back rewards, loyalty program points/rewards, extended warranties or the like, they come at the cost of higher interest rates.

From the merchant and/or financial institution perspective, these entities will typically benefit from the consumer using some sort of payment type tied to the entity, such as merchant-branded or issued credit, financial institution credit or debit or the like. Historically the merchant and/or financial institution has encouraged the customer to use their merchant or financial institution-specific payment form prior to the customer conducting a transaction. More recently, merchant and financial institutions have attempted to encourage the customer to use their specific payment form at the point-of-sale (POS) or online check-out process just prior to the customer completing the transaction. Such payment type persuasion may come in the form of signage, sales associate encouragement and/or special offers on e-commerce check-out page. However, customers are usually in a hurry to complete the transaction and are, therefore, prone to ignore any suggestions or offers to change payment type, even if the suggested payment type may be highly advantageous to the customer.

Therefore, a need exists for providing customers the ability, post-transaction, to change payment types. The customer should be presented with such a proposition shortly after the transaction has been conducted, such that the transaction is fresh in the mind of the customer and such that the payment form used to conduct the transaction has yet to post. The process for changing payment form should be simplified and automatic, such that the customer is not burdened in any way by a time-consuming process. In addition, the payment form change proposals may provide for the advantages of the alternative payment forms so that the customer is aware of the benefits posed by the proposed alternative payment types. In addition, in those instances in which the customer makes a change in payment form and the changed payment form is a credit account which accrues interest, a need exists for insuring that the credit account is paid off in a timely manner to eliminate or lessen the accrual of interest in the account.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Apparatus, methods and computer program products are defined that provide for notifying customers of an option to change payment type for a completed transaction. For example, once the customer has completed a transaction, the point-of-sale (POS) device or some other device at the merchant's location may notify the customer of the option to change payment type or an electronic notification (e.g., email, Short Message Service (SMS)/text or the like) may be communicated to the customer that indicates the option to change the payment type.

In specific embodiments of the invention an optimal payment type may be determined based on the merchant at which the transaction was conducted, the transaction amount or the type of products and/or services included in the transaction. The optimal payment type may define optimal in terms of the best warranty protection, the best interest rate, the best cash-back incentive, the best loyalty rewards points or reward or the like. In such embodiments of the invention, the customer may be notified of an option to change payment type to the optimal payment type.

In other specific embodiments, once the customer has requested a change in payment form, a remittance notification may be communicated to the customer which asks the customer is they desire to immediately remit payment to an account associated with the changed payment type. For example, if the payment type was changed to a payment type (e.g., a credit account) affording the customer better warranty coverage, better loyalty program points or the like but adversely incurring a higher interest rate, the customer will desire to pay-off that transaction amount as soon as possible so as to limit interest charges or not incur interest charges. The remittance notification allows the customer to respond to the notification, such that payment is made to the payment account associated with the changed payment type automatically from a customer-designated account.

An apparatus for providing customers an ability to change payment type defines first embodiments of the invention. The apparatus includes a computing platform having a memory and at least one processor in communication with the memory. In addition, the apparatus includes a payment type change module that is stored in the memory and executable by the processor. The module is configured to (1) receive an indication that a customer has completed a transaction with a merchant using a first payment type, (2) generate and communicate, to the customer, a change payment type notification that offers the customer an opportunity to change payment type for the completed transaction from the first payment type to one of one or more second payment types, (3) receive a customer request to change payment type from the first payment type to a customer chosen second payment type and (4) re-route transaction payment from the first payment type to the second payment type.

In specific embodiments the apparatus also includes an optimal payment type determination module stored in the memory and executable by the processor. The optimal payment type determination module is configured to determine an optimal payment type for the completed transaction based on one or more of products or services included in the transaction, the merchant associated with the transaction or an amount of the transaction. "Optimal" may be defined by one or more of an optimal interest rate, optimal warranty coverage, optimal loyalty program points or optimal cash-back reward. In such embodiments of the apparatus, the payment type change module is further configured to generate and communicate, to the customer, the change payment type notification that includes the optimal payment type.

In other specific embodiments of the apparatus, the payment type change module is further configured to generate and communicate, to the customer, the change payment type notification including stated advantages of the one or more second payment types. In still further specific embodiments of the apparatus, the payment type change module is further configured to offer the customer the opportunity to change payment type to credit associated with the merchant, for example, a merchant-branded credit card account or the like.

In further embodiments the apparatus includes a remittance notification and payment module, stored in the memory and executable by the processor. The remittance notification and payment module is configured to (1) generate and communicate, to the customer, a remittance notification that offers the customer an opportunity to remit funds, in an amount of the transaction, from a customer-designated financial account to a payment account associated with the second payment type, (2) in response to the notification, receive a customer request to remit funds from the customer designated financial account to the payment account, and (3) in response to the customer request, immediately transfer funds in the amount of the transaction from the customer-designated financial account to the payment account. In such embodiments of the apparatus, the customer may configure at least one of a time for communicating the remittance notification, a frequency of communicating the remittance notification or a communication channel for receiving the remittance notification and/or the entity associated with the second payment type (e.g. a merchant, a financial institution or the like) may configure at least one of a time for communicating the remittance notification, or a frequency of communicating the remittance notification.

A method for providing customers an ability to change payment type for a completed transaction defines second embodiments of the invention. The method includes receiving an indication that a customer has completed a transaction with a merchant using a first payment type and, in response to receiving the indication generating and communicating, to the customer, a change payment type notification that offers the customer an opportunity to change payment type for the completed transaction from the first payment type to one of one or more second payment types. In addition, the method includes receiving a customer request to change payment type from the first payment type to a customer chosen second payment type and, based on the request, re-routing transaction payment from the first payment type to the second payment type.

In specific embodiments the method may further include determining an optimal payment type for the transaction based on one or more of products or services included in the transaction, the merchant associated with the transaction or an amount of the transaction. In such embodiments, optimal is defined by one or more of an optimal interest rate, optimal warranty coverage, optimal loyalty program points or optimal cash-back reward. In further such embodiments, generating and communicating further include generating and communicating, to the customer, the change payment type notification to the customer that includes the optimal payment type.

In still further specific embodiments, generating and communicating further include generating and communicating, to the customer, the change payment type notification including stated advantages of the one or more second payment types. In further specific embodiments, the second payment type is credit associated with the merchant, such as a merchant-branded credit card account, which the customer may already own or an offer for a new merchant-branded credit card account.

Moreover, in other specific embodiments the method includes (1) generating and communicating, to the customer, a remittance notification that offers the customer an opportunity to remit funds, in an amount of the transaction, from a customer designated financial account to a payment account associated with the second payment type, (2) receiving a customer request to remit funds from the customer designated financial account to the payment account and (3) in response to the request, immediately transferring funds in the amount of the transaction from the customer-designated financial account to the payment account. In such embodiments of the method, the customer may configure at least one of a time for communicating the remittance notification, a frequency of communicating the remittance notification or a communication channel for receiving the remittance notification and/or the entity associated with the second payment type (e.g. a merchant, a financial institution or the like) may configure at least one of a time for communicating the remittance notification, or a frequency of communicating the remittance notification.

A computer program product comprising a non-transitory computer-readable medium defines third embodiments of the invention. The computer-readable medium includes a first set of codes for causing a computer processor device to receive an indication that a customer has completed a transaction with a merchant using a first payment type and a second set of codes for causing a computer processor device to generate and communicating, to the customer, a change payment type notification that offers the customer an opportunity to change payment type for the completed transaction from the first payment type to one of one or more second payment types. The computer-readable medium additionally includes a third set of codes for causing a computer processor device to, receive a customer request to change payment type from the first payment type to a customer chosen second payment type and a fourth set of codes for causing a computer processor device to re-route transaction payment from the first payment type to the second payment type.

Thus, as described in more details below, apparatus, methods and computer program products are defined that provide for notifying customers, post-transaction of the ability to change payment form for the just completed transaction. In addition, the notification may include the advantages presented by the alternative payment forms and/or the optimal payment form for the completed transaction. Once notified, the customer may effortlessly and automatically change the payment form if so desired. If the payment form is changed to an interest-bearing payment form, such as a credit or loan account, the customer may be subsequently notified with an option to automatically and immediately pay-off the transaction amount using another customer account, such as a savings account, checking account or the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
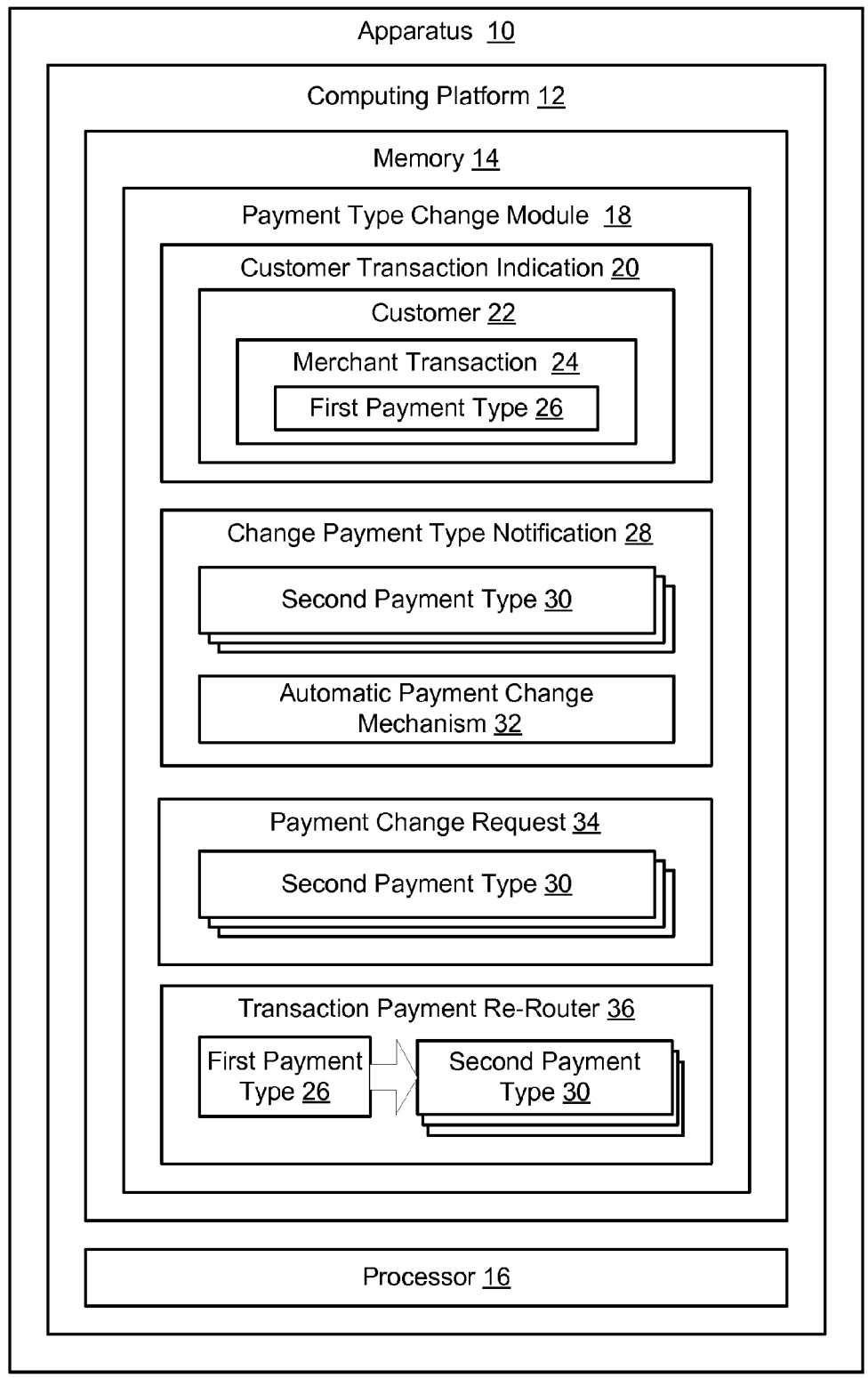
Figure 2A:
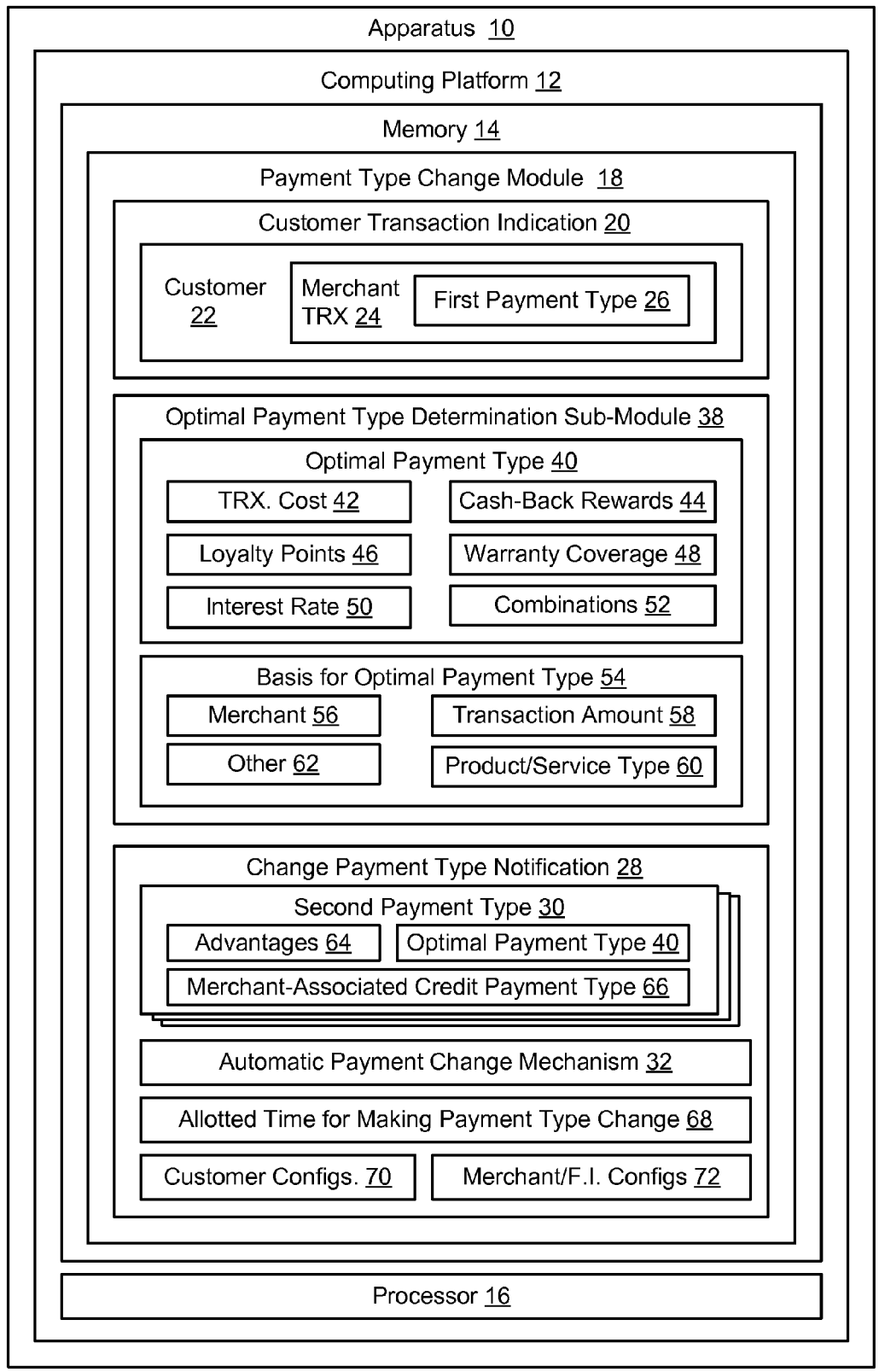
Figure 2B:
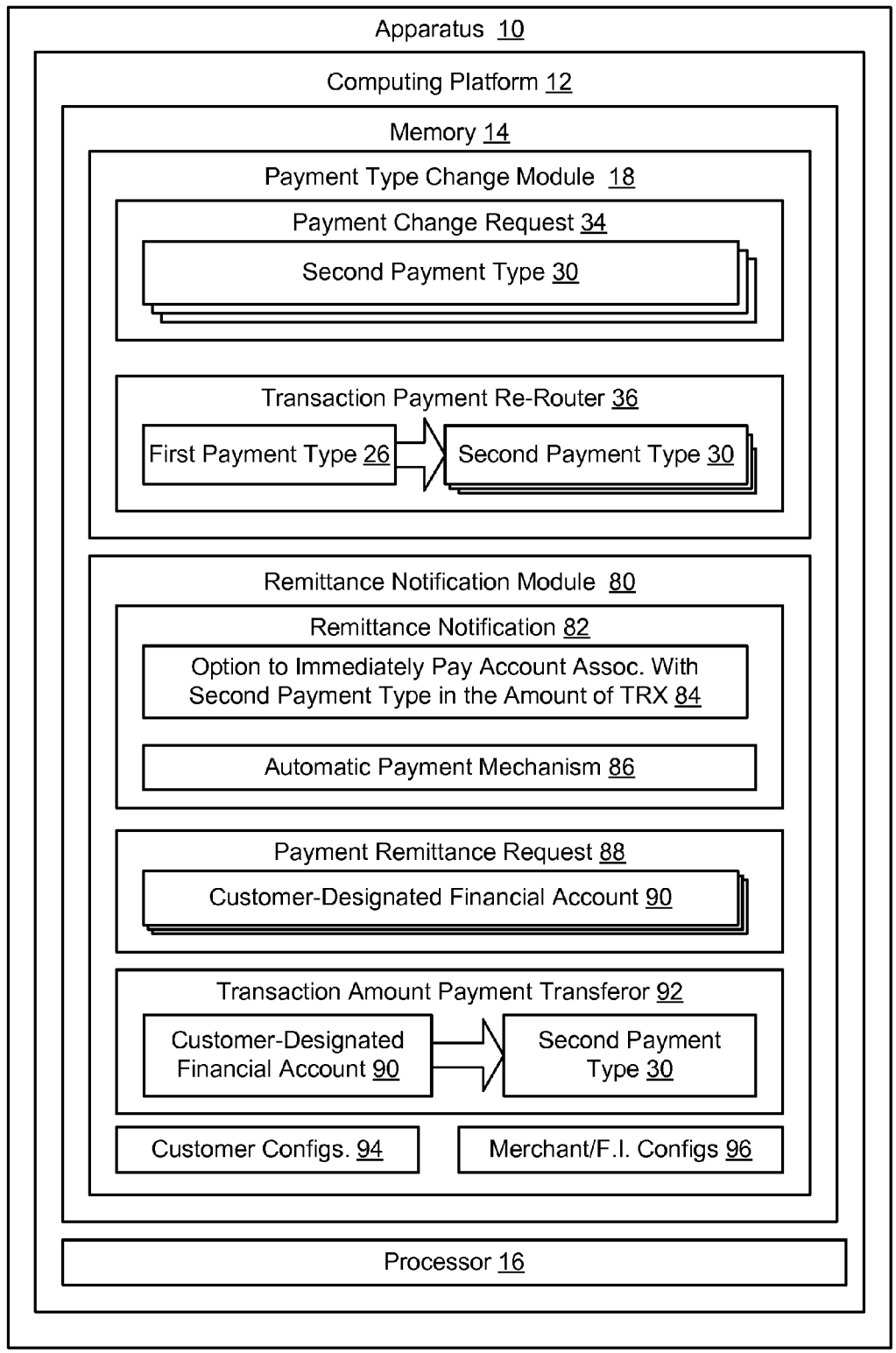
Figure 3:
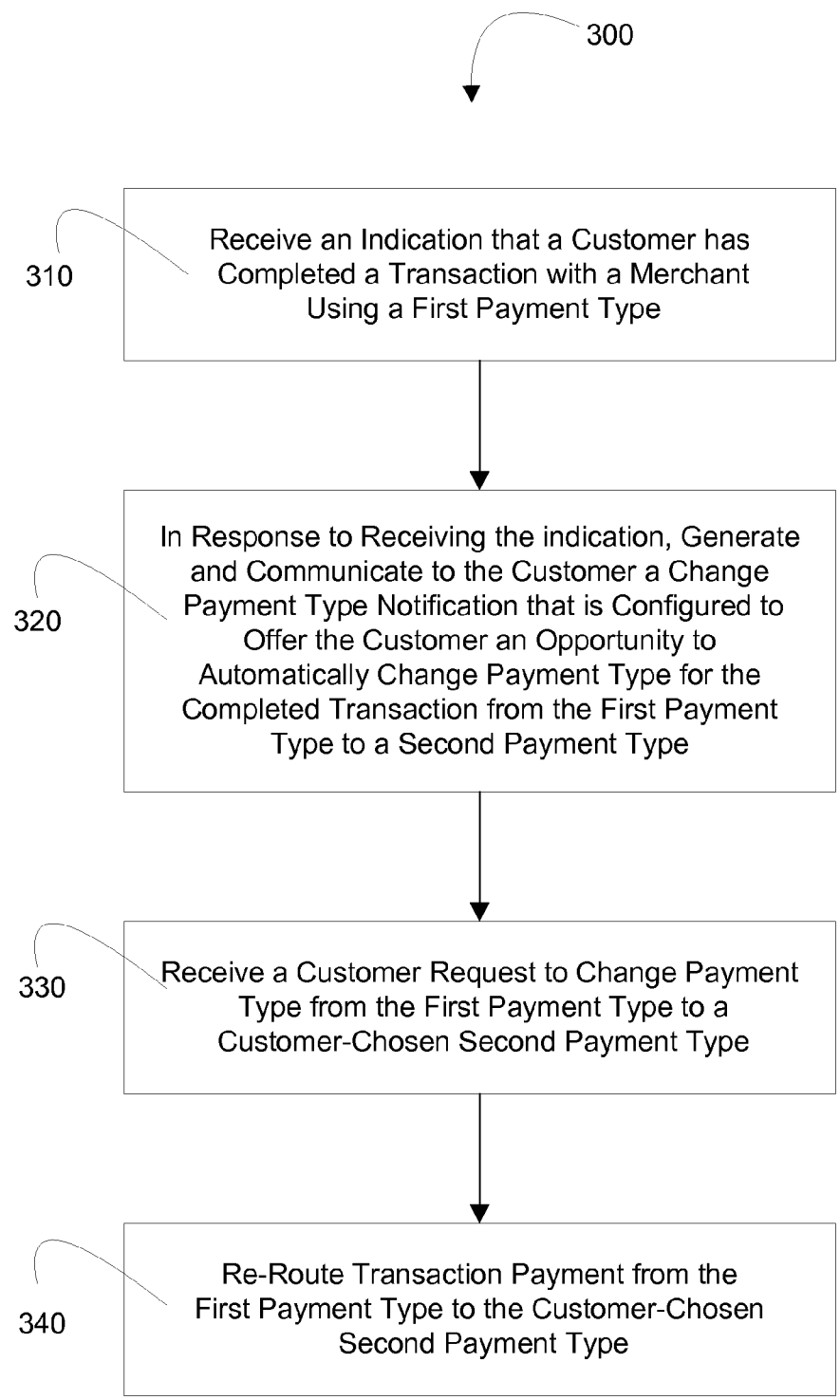

Having thus described embodiments of the invention in general terms, reference will now be made to the accompanying drawings, which are not necessarily drawn to scale, and wherein:

FIG. 1 is a high-level block diagram of an apparatus configured for providing customers post-transaction change of payment type, in accordance with embodiments of the present invention;

FIGS. 2A and 2B are a block diagram of an apparatus configured for providing customers post-transaction change of payment type, in accordance with embodiments of the present invention; and FIG. 3 is a flow diagram of a method for providing customers post-transaction change of payment type, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems and computer program products are defined that provide for customers to make post-transaction changes to payment type. The customers are notified of an option to change payment type for a completed transaction. In specific embodiments the notification occurs immediately following the transaction or shortly thereafter to insure that the transaction is still fresh in the mind of the customer and to insure that the payment type which the customer used for the transaction has yet to post. (Posting of the transaction, which typically occurs at the end of a day but may occur at shorter intervals within the day, would prohibit a further change in payment type from occurring.) For example, once the customer has completed a transaction, the point-of-sale (POS) device or some other device at the merchant's location may notify the customer of the option to change payment type or an electronic notification (e.g., email, Short Message Service (SMS)/text or the like) may be communicated to the customer that indicates the option to change the payment type. The notification includes options to change the payment type to one or more alternative payment types. In specific embodiments, the notification includes a link or some other form of automatic payment change activation, which upon customer activation (i.e., customer request) automatically processes the payment change request and re-routes payment from the initial payment type used during the transaction to the post-transaction, customer-chosen payment type.

In specific embodiments of the invention an optimal payment type may be determined based on (1) the merchant associated with the transaction, (2) the transaction amount, (3) the type of products and/or services included in the transaction or (4) any other attribute associated with the transaction. The optimal payment type may define optimal in terms of the best price or the transaction, warranty protection afforded the products or services in the transaction, the best interest rate, the best cash-back incentive, the best loyalty rewards points or reward or the like. In such embodiments of the invention, the customer may be notified of an option to change payment type to the optimal payment type and the notification may provide indications as to why the optimal payment type is optimal.

In other specific embodiments, once the customer has requested a change in payment form, a remittance notification may be communicated to the customer, which asks the customer is they desire to immediately remit payment to an account associated with the changed payment type. For example, if the payment type was changed to a payment type (e.g., a credit account) affording the customer better warranty coverage, better loyalty program points or the like but adversely incurring a higher interest rate, the customer will desire to pay-off that transaction amount as soon as possible so as to limit interest charges or not incur interest charges. The remittance notification allows the customer to respond to the notification, such that payment is made to the payment account associated with the changed payment type automatically from a customer-designated account.

Referring to FIG. 1 a block diagram is provided of an apparatus 10 configured for providing customers the ability to automatically change payment type, otherwise referred to as payment channel, payment form or the like, after a transaction is completed. The apparatus includes a computing platform 12 having a memory 14 and a processor 16 in communication with the memory 14. The memory 14 of apparatus 10 stores payment type change module 18, which is configured to provide customers, post-transaction, the ability to change payment type.

The payment type change module 18 is configured to receive a customer transaction indication 20 that indicates that a customer 22 has completed a merchant transaction 24 using a first payment type 26. The merchant transaction may be an online transaction or a conventional physical location transaction (i.e., brick-and-mortar). The first payment type 26 may be any type of payment capable of identifying the customer 22. For example, the first payment type may be associated with a credit account (e.g., a credit card transaction), a debit account (e.g., a debit card transaction), a loan account, a checking account, a mobile payment account or the like. It should also be noted that the first payment type 26 may include any combination of different payment accounts or one or more payment account in combination with a non-customer identifying payment type, such as cash or the like.

The payment type change module 18 is further configured, in response to receiving the indication 20, generating and communicating a change payment type notification 28 to the customer 22 that is configured to offer the customer 22 an opportunity to automatically change payment type for the completed transaction 24 from the first payment type 26 to one of one or more second payment types 30. In specific embodiments of the invention, the change payment type notification 28 is in the form of electronic communication, such as a short message service (SMS)/text message, an electronic mail (email) message, a short range wireless message (e.g., near field communication, Bluetooth® or the like) or the like. In such embodiments, the change payment type notification 28 may be received by the wireless communication device in possession of the customer. In alternate embodiments of the invention the change payment type notification 28 may be communicated to a display associated with a point-of-sale (POS) device, such as a card reader display, another device (e.g., kiosk) within a retail location or the like. In still further embodiments of the invention, the change payment type notification 28 may be posted or otherwise accessible via a mobile or online banking application. In most instances it will be advantageous to communicate the change payment type notification 28 to the customer 22 shortly after, if not immediately after, the completion of the transaction 24 to insure that the transaction is fresh in the mind of the customer and to insure that re-routing of the payment form the initial first payment type 26 to a second payment type 30 is still feasible. It should be noted that different payment types will afford different periods of time during which payment type change may be feasible and, in certain instances, a payment type may be prohibitive of payment type change.

The change payment type notification 28 may include one specific second payment type 30 or multiple different second payment types 30 from which the customer 22 may choose. In those embodiments in which the notification 28 includes one specific second payment type 30, the second payment type may be one preferred by the merchant or financial institution, such as a merchant associated credit type (e.g., merchant-branded credit card account), while in other embodiments the one specific second payment type may be an optimal payment type for the completed transaction. The process for determination of optimal payment types is discussed infra. in relation to FIG. 2A. In those embodiments in which the notification 28 includes more than one second payment type 30, the notification may additionally include the advantages associated with each second payment type 30 so that the customer 22 can make an informed payment change decision. It should also be noted that in certain embodiments the payment change may configured such that the customer may choose more than one second payment type 30 and designate portions of the completed transaction amount to each of the chosen second payment types 30.

As previously noted the change payment type notification 28 provides the ability for the customer to automatically change payment type, thus the notification additionally includes an automatic payment change mechanism 32, such as a link embedded in the electronic communication or the like, which upon activation by the customer initiates the automatic change of payment type from the first payment type 26 to the customer-chosen second payment type 30. The automatic payment change mechanism 32 may be configured to generate and communicate wireless (or in some embodiments, wired) communication to a network device configured to implement the payment type changes. Once the customer agrees to payment change, designated second payment type(s) for the payment change and activated the automatic payment change mechanism 32, the module receives the payment change request 34, which includes one or more second payment types 30. In the event more than one second payment type 30 is chosen by the customer 22, the payment change request 34 will also include the breakdown of the transaction amount applied to each second payment type 30. In response to receipt of the payment change request 34, the payment type change module implements transaction payment re-router 36 which is configured to re-route transaction payment from the initial first payment type 26 to the one or more second payment types 30.

Referring to FIGS. 2A and 2B, a block diagram is depicted of an apparatus 10 configured for providing customers the opportunity to change payment type after the completion of a transaction, in accordance with embodiments of the present invention. FIGS. 2A and 2B provided description of alternative embodiments of the present invention. As previously, the apparatus 10 includes a computing platform 12 having one or more processors 16 and a memory 14 in communication with the processor(s) 16. The memory 14 may comprise volatile and non-volatile memory, such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, computing platform 12 also includes processor 16, which may be an application-specific integrated circuit ("ASIC"), or other chipset, processor, logic circuit, or other data processing device. Processor 16 or another processor such as ASIC may execute an application programming interface ("API") (not shown in FIGS. 2A and 2B) that interfaces with any resident programs, such as payment type change module 18, remittance notification module 80 or the like stored in the memory 14 of the apparatus 100.

Processor 16 may include various processing subsystems (not shown in FIGS. 2A and 2B) embodied in hardware, firmware, software, and combinations thereof that enable the functionality of apparatus 10 and the operability of the apparatus 10 on a wired or wireless network. For example, processing subsystems allow for initiating and maintaining communications and exchanging data with other devices in the network. For the disclosed aspects, processing subsystems of processor 16 may include any subsystem used in conjunction with payment type change module 18, remittance notification module 80 or subcomponents or sub-modules thereof.

The memory 14 of apparatus 10 includes payment type change module 18 configured to which is configured to provide customers, post-transaction, the ability to change payment type. As previously discussed, the payment type change module 18 is configured to receive a customer transaction indication 20 that indicates that a customer 22 has completed a merchant transaction 24 using a first payment type 26. The merchant transaction may be an online transaction or a conventional physical location transaction. The first payment type 26 may be any type of payment capable of identifying the customer 22. For example, the first payment type may be associated with a credit account (e.g., a credit card transaction), a debit account (e.g., a debit card transaction), a loan account, a checking account, a mobile payment account or the like. It should also be noted that the first payment type 26 may include any combination of different payment accounts or one or more payment account in combination with a non-customer identifying payment type, such as cash or the like. The module 18 thus is in network communication with credit card processing entities, check approval entities, debit card processing entities and the like which provide the module 18 with the requisite indication 20, typically in real-time or near-real time to completion of the transaction.

In optional embodiment of the invention, the payment type change module 18 includes an optimal payment type determination sub-module 38 that is configured to determine the optimal payment type for the completed transaction prior to generating and communicating the change payment notification 28. The "optimal" payment type may be defined by the lowest transaction cost 42, the highest cash-back reward 44, the highest allotment of loyalty program point 46, the best or longest extended warranty coverage 48 the lowest interest rate 50 or combinations 52 of these optimization attributes used to determine what would be the best overall or most optimal payment type. The basis or criteria for determining the optimal payment type 54 includes, but is not limited to, the merchant 56 at which the transaction occurred, the transaction amount 58, the type of product(s) or service(s) 60 included in the transaction or any other 62 attribute associated with the transaction, the customer or the merchant which may provide for an optimal payment type. For example, if the transaction included electronics as a product type, the customer may benefit from extended warranty coverage provided by a specific type of credit. In another example, a transaction for a high amount may provide the customer with a large cash back rewards or large allotment of loyalty program rewards if a specific type of credit is used as payment for the transaction.

The payment type change module 18 is further configured, in response to receiving the indication 20 and, in some embodiments, determining the optimal payment type 40, generating and communicating a change payment type notification 28 to the customer 22 that is configured to offer the customer 22 an opportunity to automatically change payment type for the completed transaction 24 from the first payment type 26 to one of one or more second payment types 30.

As previously noted, the change payment type notification 28 may include one specific second payment type 30 or multiple different second payment types 30 from which the customer 22 may choose. In those embodiments in which the notification 28 includes one specific second payment type 30, the second payment type may be the determined optimal payment type 40. In other embodiments, the second payment type 30 may be one preferred by the merchant or financial institution, such as a merchant associated credit payment type 66 (e.g., merchant-branded credit card account). In those embodiments in which the notification 28 includes more than one second payment type 30, the notification may additionally include the advantages 64 associated with each second payment type 30 so that the customer 22 can make an informed payment change decision.

The change payment type notification 28 provides the ability for the customer to automatically change payment type, thus the notification additionally includes an automatic payment change mechanism 32, such as a link embedded in the electronic communication or the like, which upon activation by the customer initiates the automatic change of payment type from the first payment type 26 to the customer-chosen second payment type 30. The automatic payment change mechanism 32 may be configured to generate and communicate wireless (or in some embodiments, wired) communication to a network device configured to implement the payment type changes.

In addition, the notification may include the allotted time for making a payment type change decision 68. The allotted time may vary depending on the processing time for the first payment type 28, or other factors associated with the merchant, the financial institution or the customer. For example, customer status (e.g., a preferred customer status) may afford the customer an extended period of time for making the change payment type decision. In certain instances, the allotted time for making a payment type change may expire within minutes of receiving the change payment type notification 28.

It should be noted that the payment type change system of the present invention may be implemented as a merchant program or as a financial institution program. As such, the customer may register for inclusion or exclusion from the program through the merchant or financial institution (e.g., in-person registration, web-site based registration, mobile/online banking registration or the like). As such, the customer may define various customer configurations 70 that dictate various aspects of the change payment type notification 28. For example, the customer 22 may dictate the communication channel at which they desire to receive the notification 28 (e.g., text message versus email), the merchants at which they desire transactions to prompt the notification, a purchaser amount threshold that would prompt the notifications, a product or service type selection that would prompt the notifications and the like. In other embodiments the merchant or financial institution configurations 72 may be implemented, alone or unison with customer configurations 70, to dictate the parameters for communicating the change payment type notifications 28.

Referring to FIG. 2B, the payment type change module 18 is also configured, once the customer 22 has agreed to payment change, designated second payment type(s) 30 and activated the automatic payment change mechanism 32, to receive a payment change request 34, which includes one or more second payment types 30. In response to receipt of the payment change request 34, the payment type change module implements transaction payment re-router 36 which is configured to re-route transaction payment from the initial first payment type 26 to the one or more second payment types 30.

In alternative embodiments of the invention, the memory 14 of apparatus 10 also includes a remittance notification module 80 that is configured to generate and communicate a remittance notification 82 that is configured to notify the customer 22 of an option to automatically and immediately satisfy (i.e., pay) the account associated with the second payment type in the amount of the transaction 84 at the bequest of the customer 22. The remittance notification may be communicated to a customer via customer-designated communication channel, such as text message, email or the like.

As previously noted, the customer may have initial paid for the transaction using a debit account as the first payment type and subsequently changed to a credit-based second payment type for the purpose of benefiting from a lower transaction cost, additional rewards, additional loyalty program points, an extended warranty or the like. However, the credit payment type is associated with interest fees, which may be immediately assessed or assessed at various intervals, such as monthly or the like. The customer may have initially chosen debit type payment to avoid any interest-related charges. Therefore, the customer has a strong desire to lessen or possibly avoid any interest-related charges. The remittance notification 82 serves to not only remind the customer that they have certain charges pending against a credit account but also provides for the customer to immediately and automatically pay-off the credit account charges that resulted from a post-transaction payment type change. Thus, the remittance notification 82 provides the customer 22 further incentive to accept a post-transaction option to change payment type to a credit-based payment since the customer knows that the remittance notifications 82 will be forthcoming and are operative, upon customer acceptance, to immediately and automatically pay-off the outstanding credit amount equivalent to the transaction amount.

As previously noted the remittance notification 82 provides the ability for the customer to automatically pay-off the account associated with the second payment type 30 in the amount of the transaction from a customer-designated financial account 90, thus the notification 82 additionally includes an automatic payment mechanism 86, such as a link embedded in the electronic communication or the like, which upon activation by the customer initiates the automatic pay-off of the account associated with the second payment type 30. The automatic payment mechanism 86 may be configured to generate and communicate wireless (or in some embodiments, wired) communication to a network device configured to implement the payment. Once the customer agrees to automated payment, designates a financial account, such as a checking or savings account for payment for payment, and activates the automatic payment mechanism 86, the module 80 receives the payment remittance request 88, which includes one or more customer-designated financial accounts 90. In the event more than one customer-designated financial accounts 90 is chosen by the customer 22, the payment remittance request 88 will also include the breakdown of the transaction amount to be paid from each of the designated financial accounts 90 In response to receipt of the payment remittance request 88, the remittance notification module 80 implements transaction amount payment transferor 92 which is configured to transfer the transaction amount from the customer-designated financial account(s) to the second payment account 30.

The customer may define various customer configurations 94 associated with the remittance notifications that dictate various aspects of the remittance notification 82. For example, the customer 22 may dictate the communication channel at which they desire to receive the notification 88 (e.g., text message versus email), the timing and/or frequency of the notifications and the type of second payment types which dictate the notifications. In other embodiments the merchant or financial institution configurations 96 may be implemented, alone or unison with customer configurations 94, to dictate the parameters for communicating the remittance notifications 96.

Referring to FIG. 3 a flow diagram is presented of a method 300 for changing payment type-post transaction, in accordance with embodiments of the present invention. At Event 310, an indication is received that a customer has completed a transaction with a merchant using a first payment type. The indication will generally be received from a payment processing entity in real-time or near-real time to the completion of the transaction. The merchant transaction may be an online transaction or a conventional physical location transaction (i.e., brick-and-mortar). The first payment type may be any type of payment capable of identifying the customer. For example, the first payment type may be associated with a credit account (e.g., a credit card transaction), a debit account (e.g., a debit card transaction), a loan account, a checking account, a mobile payment account or the like. It should also be noted that the first payment type may include any combination of different payment accounts or one or more payment account in combination with a non-customer identifying payment type, such as cash or the like.

At Event 420, in response to the receipt of the indication, a payment type change notification is generated and communicated to the customer. The notification is configured to offer the customer an opportunity to automatically change payment type for the completed transaction from the first payment type to one or more second payment types. In addition the notification may include the advantages associated with each second payment type. In specific embodiments, the second payment type may be a merchant-associated payment type, such as merchant-issued or merchant-branded credit account.

In optional embodiments of the invention, a determination of the optimal payment type may be made prior to generating and communicating the payment type change notification, such that, the notification includes the optimal payment type. The optimal payment type may be based on one or more of transaction cost, types of products or services included in the transaction, the merchant associated with the transaction, the amount of the transaction or the like. "Optimal" may be defined by any combination of best interest rate, best warranty protection, highest allotment of loyalty program rewards, loyalty or cash-back rewards or the like.

At Event 430, in response to the customer accepting the payment change offer, a customer request to change the payment type is received. The customer request indicates the customer-chosen second payment type(s). It should be noted that the customer request is received in response to the customer activating some automatic payment change mechanism, such as a hyper-link or the like, included in the notification, such that the payment change can occur without any other intervention on behalf of the customer other than identifying the second payment type(s).

At Event 340, the transaction payment is re-routed from the first payment type to the customer-chosen second payment type.

At optional events (not shown in FIG. 3) a remittance notification may be generated and communicated to the customer that offers the customer the opportunity to automatically remit funds, in the amount of the transaction, from a customer-designated financial account (e.g., debit account, savings account, checking account or the like) to the account(s) associated with the second payment type. Such remittance serves to pay-off the transaction amount in credit accounts which may accrue interest if a payment is not forthcoming. In response to the notification, the customer may accept the offer, designated a financial institution account and activate a transfer mechanism in the notification to communicate a customer request to remit the funds, such that funds in the amount of the transaction are transferred form the customer-designated financial account to the account(s) associated with the second payment type.

Thus, apparatus, methods and computer program products are described above that provide for notifying customers, post-transaction of the ability to change payment form for the just completed transaction. In addition, the notification may include the advantages presented by the alternative payment forms and/or the optimal payment form for the completed transaction. Once notified, the customer may effortlessly and automatically change the payment form if so desired. If the payment form is changed to an interest-bearing payment form, such as a credit or loan account, the customer may be subsequently notified with an option to automatically and immediately pay-off the transaction amount using another customer account, such as a savings account, checking account or the like.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for providing customers an ability to change payment type, the apparatus comprising:

a computing platform including a memory and at least one processor in communication with the memory; and a payment type change module stored in the memory, executable by the processor and configured to:

receive an indication that a customer has completed a transaction with a merchant using a first payment type, generate and communicate, to the customer, a change payment type notification that is configured to offer the customer an opportunity to automatically change payment type for the completed transaction from the first payment type to one of one or more second payment types, receive a customer request to change payment type from the first payment type to a customer-chosen second payment type, wherein the customer-chosen second payment type is an interest-bearing credit account, and re-route transaction payment from the first payment type to the interest-bearing credit account; and a remittance notification module, stored in the memory, executable by the processor and configured to:

in response to re-routing the transaction payment to the interest-bearing credit account, generate and communicate, to the customer, a remittance notification that is configured to offer the customer an opportunity, by responding to the notification within a predetermined time period, to automatically remit funds, in an amount of the transaction, from a customer-designated financial account to the interest-bearing credit account, receive, within the predetermined time period, a customer response to the remittance notification that is configured to remit the funds, in the amount of the transaction, from the customer designated financial account to the interest-bearing credit account, and in response to receiving the customer response, transfer funds in the amount of the transaction from the customer-designated financial account to the interest-bearing credit account, wherein the transfer of funds prevents interest from being assessed to the interest-bearing credit account as a result of the re-routing of payment to the interest-bearing credit account.

2. The apparatus of claim 1, further comprising an optimal payment type determination module stored in the memory, executable by the processor and configured to determine an optimal payment type for the completed transaction based on one or more of products or services included in the transaction, the merchant associated with the transaction or an amount of the transaction.

3. The apparatus of claim 2, wherein the optimal payment type determination module is further configured to determine the optimal payment type for the transaction, wherein optimal is defined by one or more of an optimal interest rate, optimal warranty coverage, optimal loyalty program points or optimal cash-back reward.

4. The apparatus of claim 2, wherein the payment type change module is further configured to generate and communicate, to the customer, the change payment type notification that is configured to offer the customer an opportunity to automatically change payment type for the completed transaction from the first payment type to the optimal payment type.

5. The apparatus of claim 1, wherein the payment type change module is further configured to generate and communicate, to the customer, the change payment type notification including stated advantages of the one or more second payment types.

6. The apparatus of claim 1, wherein the payment type change module is further configured to generate and communicate, to the customer, the change payment type notification that offers the customer the opportunity to change payment type for the transaction from the first payment type to one of one or more second payment types, wherein the second payment type is credit associated with the merchant.

7. The apparatus of claim 1, wherein the remittance notification module is further configured to generate and communicate, to the customer, the remittance notification based on customer configuration of at least one of a time for communicating the remittance notification, a frequency of communicating the remittance notification or a communication channel for receiving the remittance notification.

8. The apparatus of claim 1, wherein the remittance notification module is further configured to generate and communicate, to the customer, the remittance notification based on an entity associated with the second payment type configuring at least one of a time for communicating the remittance notification, or a frequency of communicating the remittance notification.

9. A method for providing customers an ability to change payment type for a completed transaction, the method comprising:
    receiving, by a computing device processor, an indication that a customer has completed a transaction with a merchant using a first payment type;
    in response to receiving the indication generating and communicating, to the customer, by a computing device processor, a change payment type notification that is configured to offer the customer an opportunity to automatically change payment type for the completed transaction from the first payment type to one of one or more second payment types;
    receiving, by a computing device processor, a customer request to change payment type from the first payment type to a customer-chosen second payment type, wherein the customer-chosen payment type is an interest-bearing credit account;
    re-routing, by a computing device processor, transaction payment from the first payment type to the customer-chosen second payment type;
    in response to re-routing the transaction payment to the interest-bearing credit account, generating and communicating, by a computing device processor, to the customer, a remittance notification that is configured to offer the customer an opportunity, by responding to the notification within a predetermined time period, to automatically remit funds, in an amount of the transaction, from a customer-designated financial account to the interest-bearing credit account;
    receiving, by a computing device processor, within the predetermined time period, a customer response to the remittance notification that is configured to remit the funds, in the amount of the transaction, from the customer designated financial account to the interest-bearing credit account; and
    in response to receiving the customer response, transferring, by a computing device processor, funds in the amount of the transaction from the customer-designated financial account to the interest-bearing credit account, wherein the transfer of funds prevents interest from being assessed to the interest-bearing credit account as a result of the re-routing of payment to the interest-bearing credit account.

10. The method of claim 9, further comprising determining, by a computing device processor, an optimal payment type for the transaction based on one or more of products or services included in the transaction, the merchant associated with the transaction or an amount of the transaction.

11. The method of claim 10, wherein determining the optimal payment type further comprises determining, by the computing device processor, the optimal payment type for the transaction, wherein optimal is defined by one or more of an optimal interest rate, optimal warranty coverage, optimal loyalty program points or optimal cash-back reward.

12. The method of claim 10, wherein generating and communicating further comprises generating and communicating, to the customer, by the computing device processor, the change payment type notification to the customer that is configured to offer the customer an opportunity to automatically change payment type for the completed transaction from the first payment type to the optimal payment type.

13. The method of claim 9, wherein generating and communicating further comprises generating and communicating, to the customer, by the computing device processor, the change payment type notification including stated advantages of the one or more second payment types.

14. The method of claim 9, wherein generating and communicating further comprises generating and communicating, to the customer, by the computing device processor, the change payment type notification to the customer that offers the customer the opportunity to change payment type for the completed transaction from the first payment type to one of one or more second payment types, wherein the second payment type is credit associated with the merchant.

15. The method of claim 9, wherein generating and communicating the remittance notification further comprises generating and communicating, to the customer, by the computing device processor, the remittance notification, wherein the customer configures at least one of a time for communicating the remittance notification, a frequency of communicating the remittance notification or a communication channel for receiving the remittance notification.

16. The method of claim 9, wherein generating and communicating the remittance notification further comprises generating and communicating, to the customer, by the computing device processor, the remittance notification, wherein an entity associated with the second payment type configures at least one of a time for communicating the remittance notification, or a frequency of communicating the remittance notification.

17. A computer program product comprising a non-transitory computer-readable medium comprising:
    a first set of codes for causing a computer processor device to receive an indication that a customer has completed a transaction with a merchant using a first payment type;
    a second set of codes for causing a computer processor device to generate and communicating, to the customer, a change payment type notification that is configured to offer the customer an opportunity to automatically change payment type for the completed transaction from the first payment type to one of one or more second payment types; and
    a third set of codes for causing a computer processor device to, receive a customer request to change payment type from the first payment type to a customer-chosen second payment type, wherein the customer-chosen second payment type is an interest-bearing credit account;

a fourth set of codes for causing a computer processor device to re-route transaction payment from the first payment type to the interest-bearing credit account;

a fifth set of codes for causing a computer to, in response to re-routing the transaction payment to the interest-bearing credit account, generate and communicate, to the customer, a remittance notification that is configured to offer the customer an opportunity, by responding to the notification within a predetermined time period, to automatically remit funds, in an amount of the transaction, from a customer-designated financial account to the interest-bearing credit account;

a sixth set of codes for causing a computer to, receive, within the predetermined time period, a customer response to the remittance notification that is configured to remit the funds, in the amount of the transaction, from the customer designated financial account to the interest-bearing credit account; and a seventh set of codes for causing a computer to, in response to receiving the customer response, transfer funds in the amount of the transaction from the customer-designated financial account to the interest-bearing credit account, wherein the transfer of funds prevents interest from being assessed to the interest-bearing credit account as a result of the re-routing of payment to the interest-bearing credit account.

18. The computer program product of claim 17, further comprising an eighth set of codes for causing a computer processor device to determine an optimal payment type for the transaction based on one or more of products or services included in the transaction, the merchant associated with the transaction or an amount of the transaction.

19. The computer program product of claim 18, wherein the eighth set of codes is further configured for causing the computer processing device to determine the optimal payment type for the transaction, wherein optimal is defined by one or more of an optimal interest rate, optimal warranty coverage, optimal loyalty program points or optimal cash-back reward.

20. The computer program product of claim 18, wherein the second set of codes is further configured for causing the computer processing device to generate and communicate, to the customer, the change payment type notification to the customer that is configured to offer the customer an opportunity to automatically change payment type for the completed transaction from the first payment type to the optimal payment type.

21. The computer program product of claim 17, wherein the second set of codes is further configured for causing the computer processing device to generate and communicate, to the customer, the change payment type notification including stated advantages of the one or more second payment types.

22. The computer program product of claim 17, wherein the second set of codes is further configured for causing the computer processing device to generate and communicate, to the customer, the change payment type notification to the customer that offers the customer the opportunity to change payment type for the completed transaction from the first payment type to one of one or more second payment types, wherein the second payment type is credit associated with the merchant.

* * * * *